(No Model.)
G. D. HUFFMAN.
COMBINED GRADER AND DITCHER.
No. 340,119. Patented Apr. 20, 1886.
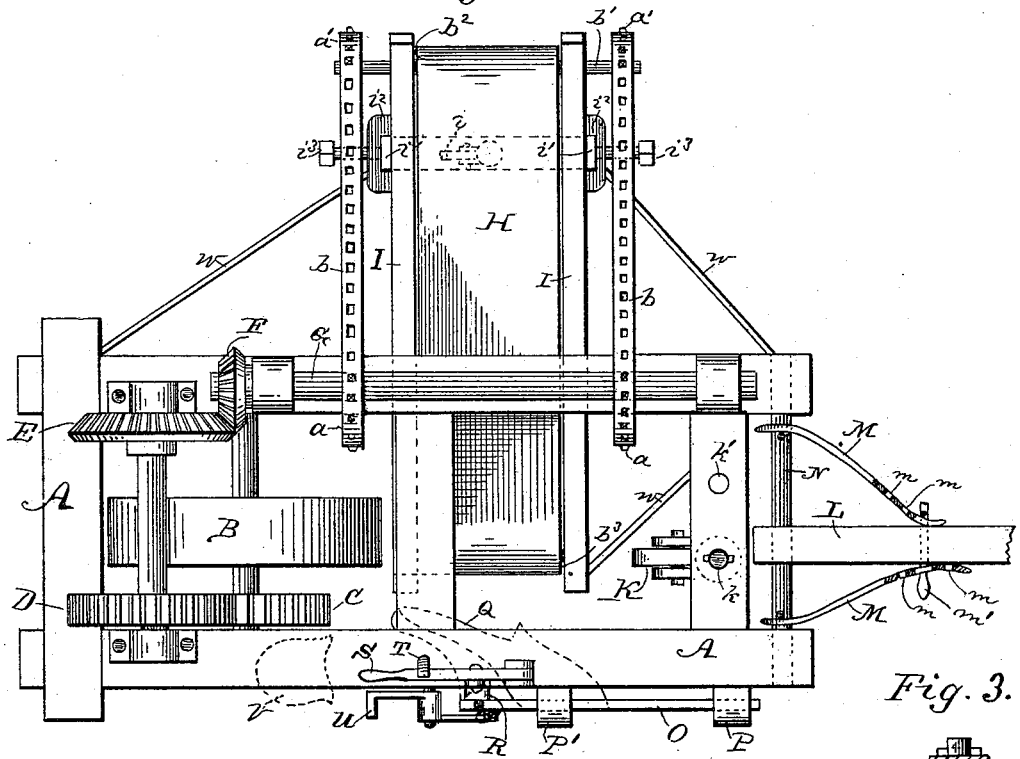
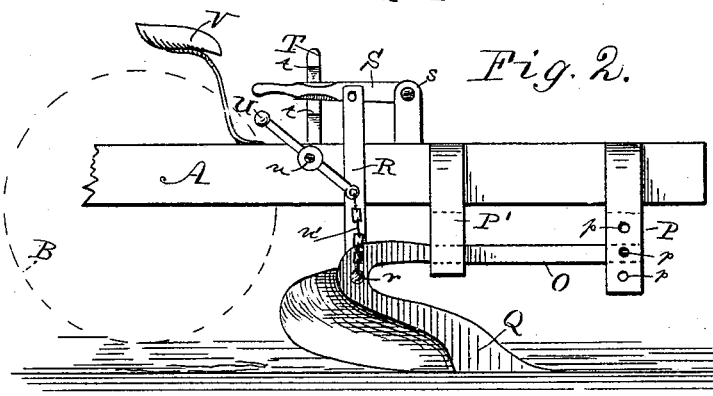
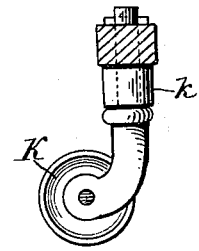
WITNESSES
Thos. H. Houghton
Will H. Cutler
INVENTOR
George D. Huffman
per Jno. H. Voorhees
Attorney

UNITED STATES PATENT OFFICE.

GEORGE D. HUFFMAN, OF ROSSVILLE, ILLINOIS.

COMBINED GRADER AND DITCHER.

SPECIFICATION forming part of Letters Patent No. 340,119, dated April 20, 1886.

Application filed December 16, 1885. Serial No. 185,825. (No model.)

*To all whom it may concern:*

Be it known that I, GEORGE D. HUFFMAN, a citizen of the United States, residing at Rossville, in the county of Vermilion, State of Illinois, have invented certain new and useful Improvements in Combined Graders and Ditchers, of which the following is a specification, reference being had therein to the accompanying drawings.

This invention relates to that class of combined grading and ditching machines which are used both for excavating ditches and conveying and discharging the earth so excavated by means of side carriers or endless aprons attached to and operated by the machinery and motive power of the invention.

My invention consists in the construction and combination of the parts hereinafter described, reference being had to the accompanying drawings, in which—

Figure 1 represents a plan view of the whole machine, and Fig. 2 a side view of the plow, and mode of suspending and adjusting the same detached. Fig. 3 is a view of caster-wheel K and loose collar $k$ detached.

Similar letters refer to similar parts throughout the different views.

A A represent a frame of timber of suitable dimensions and strength for the intended use.

B is a driving-wheel, whose axis is journaled in yokes under the main frame A.

C is a pinion secured to the shaft of B, and meshing with D, a similar pinion secured to a shaft in the rear of the driving-wheel B.

E is a beveled gear-wheel or pinion secured to the same shaft with D, and meshing with a beveled gear-wheel, F, secured to the shaft G, which shaft G is journaled on the frame A, and runs at right angles to the shaft of the driving-wheel B.

I I is a carrier-frame secured to the main frame A, under which it runs, and to which it is secured by bolts and the stay-rods $w$ $w$ $w$.

On the shaft G are secured sprocket-wheels $a$ $a$, and at the upper end of the carrier-frame I I are similar sprocket-wheels, $a'$ $a'$, secured to the shaft $b'$, and $b$ $b$ are chain belts running over said sprocket-wheels.

H is an endless apron of hinged slats or canvas running on rollers $b^2$ $b^3$ and continuous similar rollers in the carrier-frame. The carrier-frame is also supported by a caster-wheel, $i$, beneath it, whose vertical axis plays in a transverse bar, $i'$, the standards of which project upward through slots in brackets $i^2$ $i^2$, and may be lowered or raised at will, and held in place by the set-screws $i^3$ $i^3$, thus enabling the operator to elevate or lower the outer end of the carrier-frame.

Q is a plow attached to the beam O, which beam is pivoted at its forward end at $p$ to a bracket, P, secured to the main frame A. The beam O also moves in and is secured from lateral motion by the slotted bracket P', secured to the main frame A.

U is a lever fulcrumed at $u$, and attached to the plow-beam by a link, $u'$.

S is a lever fulcrumed to the standard $s$, and pivoted to the vertical bar R, which bar is also pivoted to the plow-beam at $r$, the point at which the link $u'$ is attached.

T is a vertical standard notched to engage the lever S in such manner that by depressing said lever it is caught in and held down by the notches $t$ $t$, and the plow also depressed, while by a simultaneous pressure from the foot of the driver of the grader upon the lever U the plow will be held firmly in the position desired. The position of the forward end of the beam O may also be altered, and the pitch of the plow changed by pivoting the beam in either of the holes $p$ $p$ $p$ in the bracket P.

K is a caster-wheel supporting the forward end of the main frame A. It has a loose collar, (letter $k$) which may be placed on the vertical axis, either above or below the cross-beam of the main frame, in which this axis plays, and thus elevate or lower the frame.

L is the tongue, which is secured to and may be moved laterally on the round bar N, which passes through a corresponding hole in the rear end of the tongue.

M M are adjustable hounds connecting and bracing the tongue L with the bar N. These hounds have a series of holes, $m$ $m$ $m$, through which the pin $m'$ is passed to secure the hounds to the tongue, in which there are similar holes. The position of the tongue may be changed from a central point between the parallel timbers of the frame A to one nearer the line of the plow, or the reverse, by sliding it to either side, and connecting the hounds to it at unequal lengths, as shown by the drawings, Fig. 1, and by these means the line of the draft will be altered, and the power applied at the most advantageous point. The position of the caster-wheel K may also be altered to conform to a new position of the tongue by inserting its axis at k'.

V is the seat of the driver, located to command the levers S and U.

The location of the plow is such that the earth thrown from the furrow when the grader is progressing and the plow performing its work is cast directly upon the lower end of the carrier and conveyed thereon and discharged from the upper end.

The operation of the machine is obvious from the description thus given of its different parts and their connection. The motive power is the team attached to the forward part of the grader by the tongue and usual appliances. The driving-wheel B, by its revolutions, communicates motion from the pinion C to the pinion D, and the beveled pinion E to the beveled pinion F and the sprocket-wheels a a a' a', which in turn operate the apron on the carrier-frame. The means of elevating or lowering the plow, and thus regulating the depth of its working, and also of lifting it over obstructions, or of stopping its work altogether, as in turning, or in other cases, is also obvious.

When it is desired only to excavate a ditch, the grader should, when at the end of a furrow, be turned to the right, and the earth will in this case be thrown from the center, and when it is desired to throw the earth to the center, as from ditches at the side of a road, the machine should be turned to the left, thus enabling the operator to raise the center of the road.

My improvement combines great simplicity and economy of construction with lightness of draft, and a perfect command by the driver from his position over the movement and operation of the machine.

Having described my invention, what I claim is—

A combined grader and ditcher consisting of a main frame, A, a single driving-wheel, B, an adjustable plow, Q, a carrier-frame, I I, and endless apron H, sprocket-wheels a a a' a', and chain belts b b, an adjustable wheel, K, and the device consisting of the adjustable hounds M M, constructed to effect the purpose described, all constructed, combined, and arranged to operate substantially as set forth and described.

In testimony whereof I affix my signature in presence of two witnesses.

GEORGE D. HUFFMAN.

Witnesses:
B. F. COOK,
M. E. HAINES.